US011586482B2

(12) United States Patent
Che et al.

(10) Patent No.: US 11,586,482 B2
(45) Date of Patent: Feb. 21, 2023

(54) DEPLOYMENT OF SERVICES WITH DEPENDENCIES

(71) Applicant: EMC IP Holding Company LLC, Hopkinton, MA (US)

(72) Inventors: Roger Che, Shanghai (CN); Zak Liang, Shanghai (CN); James Morton, Adamstown, MD (US); Lihui Su, Shanghai (CN); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/336,714

(22) Filed: Jun. 2, 2021

(65) Prior Publication Data

US 2022/0391263 A1 Dec. 8, 2022

(51) Int. Cl.
*G06F 7/06* (2006.01)
*G06F 9/52* (2006.01)
*G06F 9/54* (2006.01)

(52) U.S. Cl.
CPC .............. *G06F 9/52* (2013.01); *G06F 9/547* (2013.01)

(58) Field of Classification Search
CPC .................................. G06F 9/52; G06F 9/547
See application file for complete search history.

(56) References Cited

U.S. PATENT DOCUMENTS

| 10,949,198 | B1* | 3/2021 | Weston | G06F 8/76 |
|---|---|---|---|---|
| 2018/0075158 | A1* | 3/2018 | Li | G06F 8/433 |
| 2020/0259715 | A1* | 8/2020 | Schermann | H04L 41/22 |
| 2020/0401386 | A1* | 12/2020 | Punathil | G06F 8/433 |
| 2021/0135973 | A1* | 5/2021 | Vedam | H04L 45/02 |
| 2022/0091829 | A1* | 3/2022 | Silva | G06F 8/77 |

* cited by examiner

*Primary Examiner* — Timothy A Mudrick
*Assistant Examiner* — Abdou K Seye
(74) *Attorney, Agent, or Firm* — Womble Bond Dickinson (US) LLP

(57) ABSTRACT

Metadata includes runtime dependencies for services that form an application. Each runtime dependency includes one or more of the one or more services, unless it has no runtime dependencies. A first of the services is selected, based on the metadata, that does not have runtime dependencies or those runtime dependencies are operational. The selected service is started. Other embodiments are described and claimed.

20 Claims, 7 Drawing Sheets

```
DEPLOYMENT ALGORITHM
601 def deploy(outbound):
    inbound = resolve_inbound(outbound)
    deploy_queue = list()
    traverse outbound and add any service that doesn't have a down_stream service to the deploy_queue
    while deploy_queue has item:
        pop service off of deploy_queue
        deploy service and wait for service to become operational
        up_streams = inbound[service]
        for up_stream in up_streams:
            remove service associated with the outbound up_stream
            if len(outbound[up_stream]) == 0:
                add up_stream to the deploy_queue def resolve_inbound(outbound):
    inbound = dict()
    for each service in outbound, determine and store inbound relationships
    return inbound
```

DEPLOYMENT OF SERVICES WITH DEPENDENCIES

TECHNICAL FIELD

Embodiments of the present disclosure generally relate to deployment services that have dependencies. In particular, some embodiments of the disclosure relate to deployment of containerized microservices that have dependencies.

BACKGROUND

Data is an important asset for businesses. Data can be stored on servers which can be cloud-based and/or reside in a local network. Applications are run on servers to manage the data for a variety of computing needs.

A monolithic software architecture is characterized by a software that is (e.g., computer instructions) are built as a single application. Such a solution can include a client-side user interface, a server side-application, a database, or combinations thereof. Application functionality with monolithic software architecture is unified and managed and served from a single application base. Monolithic applications lack modularity-they have a single large code base. To make changes and upgrades, a developer would make changes to the entire application. Thus, the monolithic software architecture can be cumbersome and require large efforts to make small changes.

Virtual machines (VMs) allow internet providers to run multiple operating system instances on a common server. With VMs, applications can be isolated from each other in the same server, thus reducing the need for buying or maintaining multiple servers. VMs, however, can consume system resources because they make virtual copies of resources such as operating systems, etc. For servers to run VMs, a substantial amount of RAM, clock time, and operating system licenses may be required.

Deployment of software can refer to the process of running an application on a server or other target computing device (e.g., a production environment, a desktop, laptop, smart phone, tablet computer, or IoT device). The deployment of software can include making the application work properly on the device. Common activities that coincide with deployment include software release, installation, testing, deployment, and performance monitoring.

BRIEF DESCRIPTION OF THE DRAWINGS

Embodiments of the disclosure are illustrated byway of example and not limitation in the figures of the accompanying drawings in which like references indicate similar elements.

FIG. 6 shows an example of a deployment algorithm, according to some embodiments.

DETAILED DESCRIPTION

Figure 1:
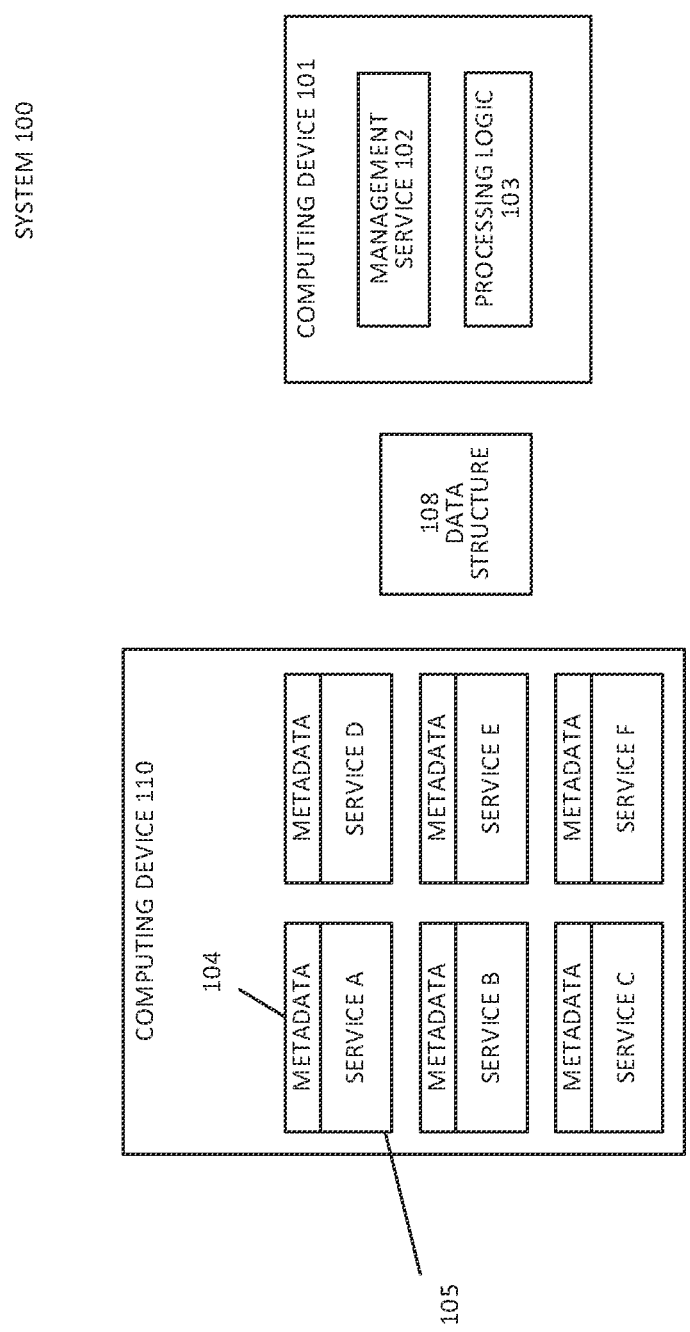
FIG. 1 shows a system for managing service deployment, according to some embodiments.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Containers, also referred to herein as containerized environments, support multiple applications to be virtualized at runtime on a common OS instance. A container can have dedicated resources such as its own file system, RAM, CPU, storage, and access to specified system resources. Containers can include packages of your software that include everything that it needs to run, including code, dependencies, libraries, binaries, and more. As such, compared to VMs, containers can share the operating system kernel instead of having a full copy of an OS kernel per instance. Thus, container scan require less resources and be more portable than a traditional VM architecture.

Microservices can be services that share business dependencies and communicate each other such that, as a group, they perform operations in a synchronized manner and serve to meet needs of a user similar to a monolithic application. Microservices can be grouped in a container, thus the microservices in a container can user those dedicated resources of a container. Different containers and the microservices grouped in respective containers do not require separate operating systems, as opposed to a VM architecture. Thus, a containerized microservices architecture can reduce overhead, for example, to host multiple containerized microsystems.

With microservices architecture, an application can comprise individual services (e.g., microservices) that communicate with each other through one or more APIs (e.g., REST, WebHooks, etc.). Microservices offer a different approach to application development and deployment, and is suited to the agility, scale, and reliability requirements of modern cloud applications. Such an architecture empathizes that each of the individual services of the application are small enough to reflect independent concerns and functionality, so that each service implements a single function. In addition, each microservice can have a well-defined contract. Other microservices in the application can use the contract to communicate with the and share data with the microservice. An example of microservices in an application can include a shopping cart microservice, an inventory processing microservice, purchase subsystems, and payment processing for an application.

Deployment of microservices can be challenging, due to interdependencies among the microservices. For example, a Service A may need to read data from Service B through Service B's API. Thus, Service A has a dependency to Service B. A proper order of deployment of microservices in a microservices application may need to be enforced in order to start up elegantly and reduce the risk of corrupt states or data. For example, if Service A is deployed and running before Service B is operational, the data read from Service B may be corrupt or uninitialized, which could result in an unexpected or undesirable results. Thus, deployment of an application that includes Service A and Service B should ensure that Service B is operational before Service A is deployed.

Some container environments (for example, Kubernetes) do not support Pod or Service dependency management during the deploy time. In such environments, there is no declaration of a pod or service dependency. All Pods are started at any order, depending on internal scheduling. In order to maintain proper boot order, functionality is imbedded in a special init-container of a Pod. In the init-container ad-hoc code is responsible to check the dependencies. The main container of the Pod will start after the init-containers to deploy.

Some container environments (e.g., Docker Swarm) can use a docker-compose file that is tied to the application code. Dev-ops can declare a service start order through a field 'depends-on'. The environment and management service, however, does not check the service readiness and requires a developer to have ad-hoc script to check dependencies in a container entry point script. Such a system does not completely address the dependencies at deployment, for example, timing issues, that could result in corruption of data or an unexpected state of a service.

As described above, some deployment strategies for container environment solutions manage the service dependencies as part of the operation of the application (e.g., in the code of the services). Such practice adds more complexity to development of the services, and can be tedious and error prone to manage.

Solutions that resolve dependencies for software compile time can resolve package or library dependencies at development time or compile time. Such solutions, however, are not portable to a containerized microservice environment.

FIG. 1 shows a system for managing service deployment, according to some embodiments. A system 100 can include a computing device 101 that includes a management service 102. The management service can deploy one or more services 105 in a computing device 110. The one or more services can be microservices that form a microservices application.

In some embodiments, computing device 110 is the same computing device as computing device 101—the management service and the services can reside in the same machine. In other embodiments, the computing device 110 is different from computing device 101, thus the management service can reside on a different machine than the services. In such a case, the respective computing devices can communicate with each other over a network through one or more communication protocols such as TCP/IP, Wi-Fi, LTE, 5G, etc.

Each of the services 105 can be an application (e.g., software) that runs on a computing device. A service can respond to network requests. The services can have runtime dependencies to each other, such as Service A accessing data of Service B, and so on. Each service can have metadata 104 that includes a dependency declaration. The dependency declaration can be a list of service IDs that the metadata's service is dependent on. For example, if 'service_a' is dependent on 'service_b' and 'service_c', then the metadata of Service A can have a dependency declaration stating "service_a: service_b, service_c". This metadata can be stored in computer-readable memory as a text file or other format. Each metadata can be independently stored from the service that it describes, for example, separate from software instructions of the service.

The metadata for each of the services can be grouped and stored into a data structure 108. Grouping of the metadata into the data structure can be performed automatically by developer tooling, a script, an application, and/or management service 102. In needed, this can be performed manually by a developer. The data structure can contain all the interdependencies of services A-F that form an application.

Starting of each of the services (e.g., deployment) can be orchestrated by the management service 102. The management service can scan the data structure and call start each of the services in a manner that preserves the runtime dependencies of each service. Management service 102 can include one or more algorithms that process the dependency declarations in the data structure to select and start each of the services (e.g., sequentially). Management service can be implemented by processing logic 103 that comprises hardware (e.g. circuitry, dedicated logic, etc.), firmware, software (e.g., embodied on a non-transitory computer-readable storage media), or a combination of both.

Figure 2:
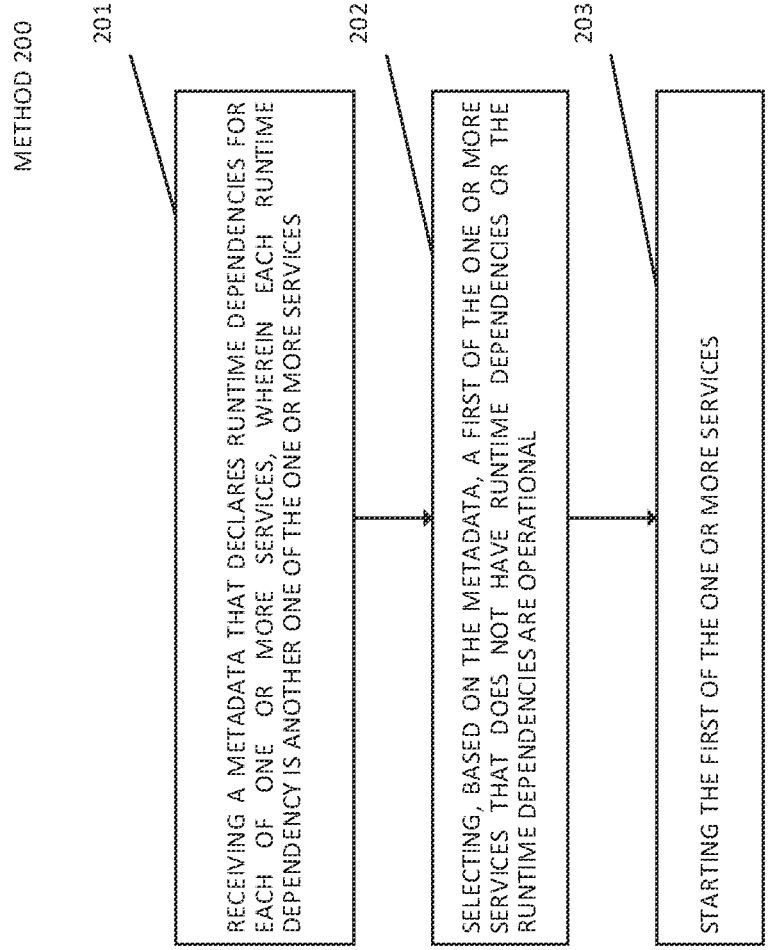
FIG. 2 shows a method for managing service deployment, according to some embodiments.

FIG. 2 shows a method 200 for managing service deployment, according to some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are disclosed in method 200, such blocks are examples. That is, embodiments are well suited to performing various other blocks or variations of the blocks recited in the method. It is appreciated that the blocks may be performed in an order different than presented, and that not all of the blocks in the method may be performed.

At block 201, processing logic can receive metadata that declares runtime dependencies for each of one or more services, wherein each runtime dependency is another one of the one or more services, unless it has no runtime dependencies. For example, if one or more services includes a Service X, Y, and Z, the services that X, Y, and Z depend on can be limited to Service X, Y, and Z. Otherwise, if there are services, X, Y, or Z depend on a service V that does not also have declaration dependencies in the metadata, then processing logic will not know what the dependencies of service V are. As such, processing logic would not know how to properly deploy service V, which could hold up the entire method. Thus, each runtime dependency can be another of the one or more services. As described, the metadata can be gathered and stored in a data structure such as data structure 108.

A runtime dependency is a dependency that one service has on another during the runtime of the service. For example, a Service A and Service B may be microservices in a containerized application. Service A may call upon an API of Service B to retrieve data during runtime. If Service B is not operational when Service A calls upon this data, then the outcome can result in an unexpected and unpredictable consequence. Thus, the runtime dependencies for each of the one or more services defines what runtime dependencies each service has, if any. Some of the one or more services will have no runtime dependencies. The services with no runtime dependencies can have metadata that declares that no runtime dependencies exist, e.g., an empty set of runtime dependencies.

At block 202, processing logic can select, based on the metadata, a first of the one or more services that does not have runtime dependencies or the run time dependencies are operational. Processing logic can use one or more algorithms as described in other sections to select one of the one or more services that does not have any runtime dependencies, or has a runtime dependency on a service that is already operational. For example, if Service X does not have any runtime dependencies, it can be selected. In another example, if Service A depends on Service B, and processing logic determines that Service B is operational, processing logic can select Service A.

At block 203, processing logic can start the first of the one or more services. Processing logic can cause a computing system to execute software instructions of the service, thereby starting or deploying the service. After a service has started, the service may take a moment until becoming operational.

Blocks 202 and 203 can be repeated for each of the one or more services until all of the services are deployed. Processing logic can perform method 200 to serve as a management service, which can also be referred to as an orchestrating service. Each of the services can be microservices that operate in a containerized environment such that the microservices each share those resources allocated to a common container.

Figure 3:
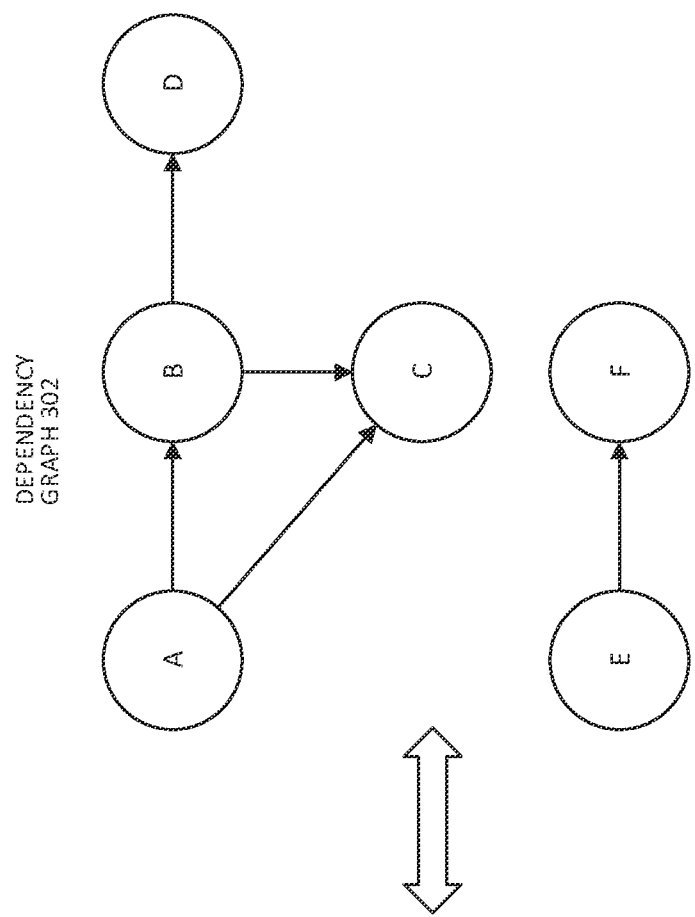
FIG. 3 shows a data structure for representing dependency of services, according to some embodiments.

FIG. 3 shows a data structure 301 for representing dependency of services, according to some embodiments. Such a data structure can hold metadata for one or more services. The metadata can be stored in a data structure that represents a runtime dependency graph 302 of the one or more services. In particular, the data structure can include the runtime dependency declarations of each of one or more services, organized as a dependency graph, that act together to serve as an application (e.g., a microservices application) as described with respect to other figures.

The dependency graph 302 can be a graph with direction and without cyclic dependencies. The dependency graph can characterize the possible orders in which each service can be deployed. If the dependency graph has an edge from one service to another service, then the service that the edge ends at must be started before the service that the edge begins in. For example, here, service D must be started before service B. There can be more than one order that satisfies the dependencies. Determining such an order can be referred to as a topological sort of the dependency graph. Processing logic can apply a deployment algorithm to perform a topological sort.

The data structure 301 includes runtime dependencies of services, which can be gathered from dependency declarations of each of the services, as described. The data structure can be implemented as a 'Map' with 'Key'/'Value' pairs. Each key can hold a service ID of each of the one or more services. The value of each key can be the set of service IDs that the service of the Key service ID is dependent on. The services without dependencies can be represented with an empty value set. For example, the Key/Value pair of "service_a": {"service_b", "service_c" }, declares that Service A (identified as 'service_a') has a set of dependencies that are Service B and Service C, identified as 'service_b' and 'service_c'. Some services, such as Service C, D, and F do not have any runtime dependencies—they do not depend or require another service to be operational prior to being started. The data structure, which can represent the dependency graph, can be used by an algorithm to deploy each microprocess.

For example, FIG. 6 shows an example of a deployment algorithm 601, according to some embodiments. The deployment algorithm is shown with pseudocode for clarity.

In this example, 'outbound' can be a Map data structure, as described. The data structure can store service ID of a service as key, and service IDs of other services that depend on that service as the value associated with the key, for example, as shown in data structure 301. The data structure can serve as the input of the algorithm.

'Inbound' can be second data structure, such as a Map, that stores a service ID of a service as key, and the service IDs of other services that depend on that service as the value associated with key. 'Inbound' relationships are determined based on 'outbound', but are inverted. For example, if Service A has a dependency to Service B, then outbound will have service A in the key and service B in the value. Inbound will have Service B in the key and Service A in the value.

'Down_streams' represents a set of services that a given service is dependent on. For example, referring back to the example in FIG. 3, Service B and C are the down_streams of Service A. 'Up_streams' represents a set of services that depend on a given service. For example, in FIG. 3, Service A and B are the up_streams of Service C.

'Deploy_queue' is a queue of services that are candidates for deployment. The services that the algorithm adds to this queue already have their dependencies resolved. Thus, the services in this queue can be deployed. Upon deployment, the algorithm can wait for the deployed service to become operational before continuing. Otherwise, even though the order of deployment may be correct, timing issues can still cause unwanted artifacts, corrupt data, unknown states, etc.

In FIG. 6, the algorithm receives the outbound data structure and creates an inbound data structure from it. The deploy_queue is generated and populated with services in outbound that do not have any down_stream services. Such services do not depend on other services and can readily be deployed.

Services can be popped off of the deploy_queue one by one and deployed. The deploy_queue can use a first-in, first-out order (FIFO). As each service is deployed, the algorithm can wait until that service becomes operational before continuing. Up_streams can be updated for each service that is popped off, and the up_stream service can be added to the deploy_queue. The deployment of the service is repeated until no services are left in the deploy_queue. As an example, given the dependencies in the example of FIG. 3, the deploy order given by the algorithm of FIG. 6 can be: service_c, service_d, service_f, service_b, service_e, service_a.

Other algorithms can also be implemented to determine different topological orderings while still satisfying the dependencies—there can be more than one solution. For example, processing logic can perform a Kahn algorithm or depth-first search on the data structure to determine an order of the services to select and deploy.

Figure 4:
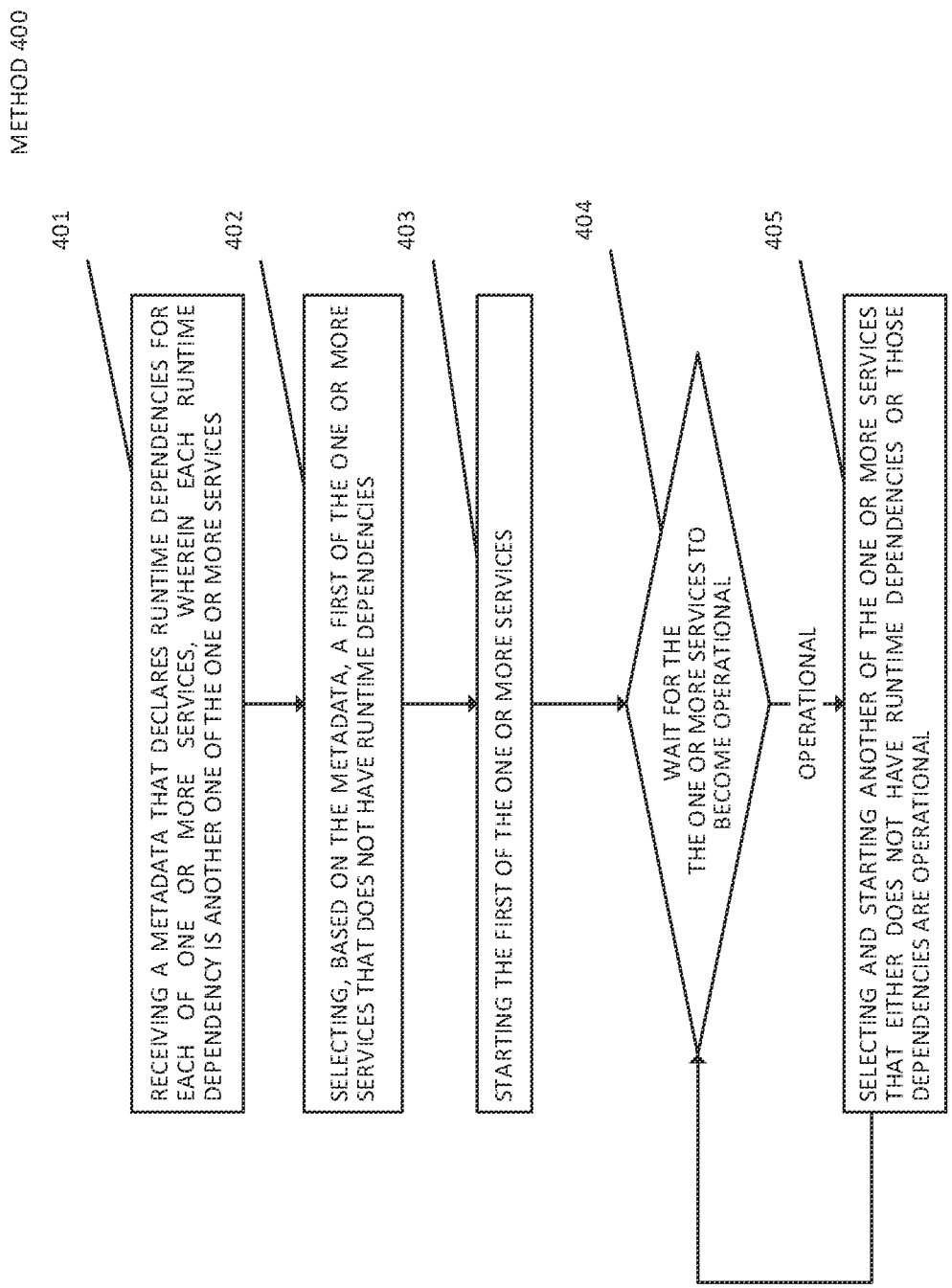
FIG. 4 shows a method for managing service deployment with operational checking, according to some embodiments.

FIG. 4 shows a method 400 for managing service deployment with operational checking, according to some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are disclosed in the method, such blocks are examples. That is, embodiments are well suited to performing various other blocks or variations of the blocks recited in the method. It is appreciated that the blocks may be performed in an order different than presented, and that not all of the blocks in the method may be performed.

Blocks 401, 402, and 403 can include the features described with respect to blocks 201, 202, and 203 of FIG. 1. At block 404, processing logic can wait for the first of the one or more services that has been deployed to become operational. Processing logic can determine whether a service that has started is operational by querying the first service through an API (e.g., a REST API, or other API). The queried service can respond to indicate that it is operational (e.g., by returning true), or that it is not operational (e.g., by returning false). Processing logic can deem the service to be operational when it receives a response from the service that it is operational.

In response to the service becoming operational, processing logic can, at block 405, select and start another one or more services (e.g., a second of the one or more services) that either a) does not have any runtime dependencies and/or b) has dependencies but any such service that the selected service is dependent on is currently operational. As discussed, selection of the services can be performed using one or more algorithms to determine a topological ordering to the runtime dependencies. Blocks 404 and 405 can be repeated until all of the one or more services are operational. When all the one or more services are operational, the application formed by the one or more service scan be fully deployed.

Figure 5:
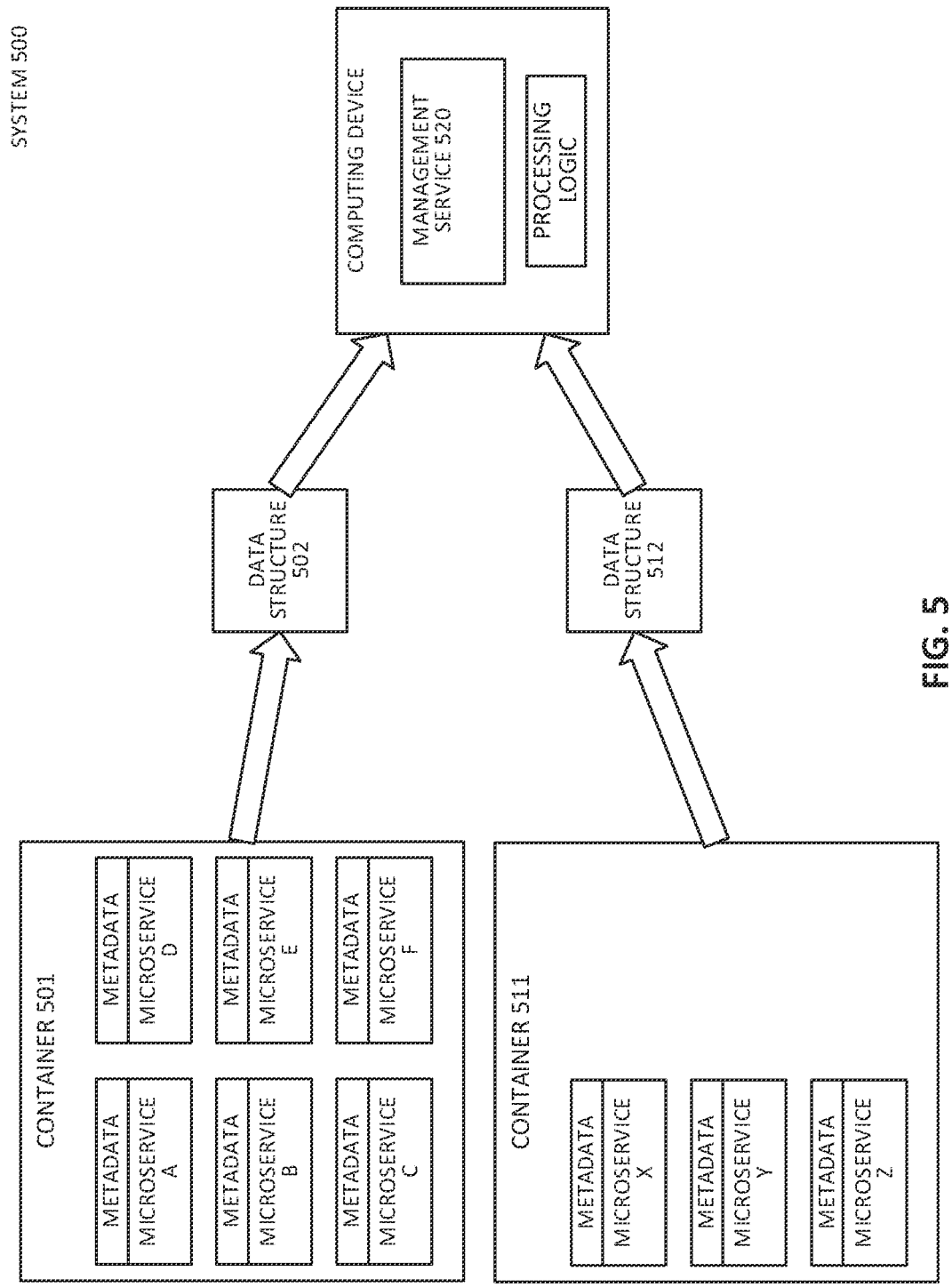
FIG. 5 shows a system for managing service deployment in a containerized environment, according to some embodiments.

FIG. 5 shows a system for managing service deployment in a containerized environment, according to some embodiments. One or more microservices can run in a containerized environment. In this example, management service 520 can manage multiple containers, such as container 501 and container 511 that each support respective microservices.

As described, each container can have dedicated compute resources that do not mingle with another container's resources. Containerization can include a container application and its versioned set of dependencies, plus its environment configuration abstracted as deployment manifest files. These can be packaged together as a container image, tested as a unit, and deployed to a host operating system. Each container can be an isolated, resource controlled, and portable operating environment, where an application (e.g., one or more services working together) can run without touching the resources of other containers, or the host. Therefore, a container can behave like a newly installed physical computer or a virtual machine.

A container can an operating system, have a file system, and can be accessed over a network as if it were a physical or virtual machine. Unlike VMs, however, containers can share an operating system with other containers, and/or run as isolated processes on the host operating system. Therefore, containers 501 and 511 can share resources and reduce the resources required to support the containers, as compared to virtual machines.

The microservices supported by each container can each serve as separate applications. For example, microservices A-F in container 501 can serve as an online casino, while microservices X-Z serve as a digital marketplace for fishing equipment. Containers 501 and 511 can reside on the same or different computing devices.

Data structure 502 can include the runtime declaration dependencies of microservices A-F. Similarly, data structure 512 can include the runtime declaration dependencies of microservices X-Z. Management service 520 can deploy the microservices of container 501 by selecting and deploying them one at a time, as described in other sections. Similarly, the management service can deploy the microservices of container 502.

Management service can deploy the microservices directly or by communicating one or more deploy messages to the respective containers. As such, a central management service can deploy one or more microservices applications in a manner that reduces the risk of unwanted artifacts such as corrupt data and states. The central management service can use described algorithms to process runtime dependency declarations of each microservice. The management service can automatically deploy microservices even if there are complex dependencies among the microservices.

The logic and implementation of the deployment (e.g., the runtime declaration dependencies, data structures, and central management service) can be separate from the services. A developer can simply note the dependency of each service, as a runtime dependency declaration, and the rest of the deployment operation can be automated.

Figure 7:
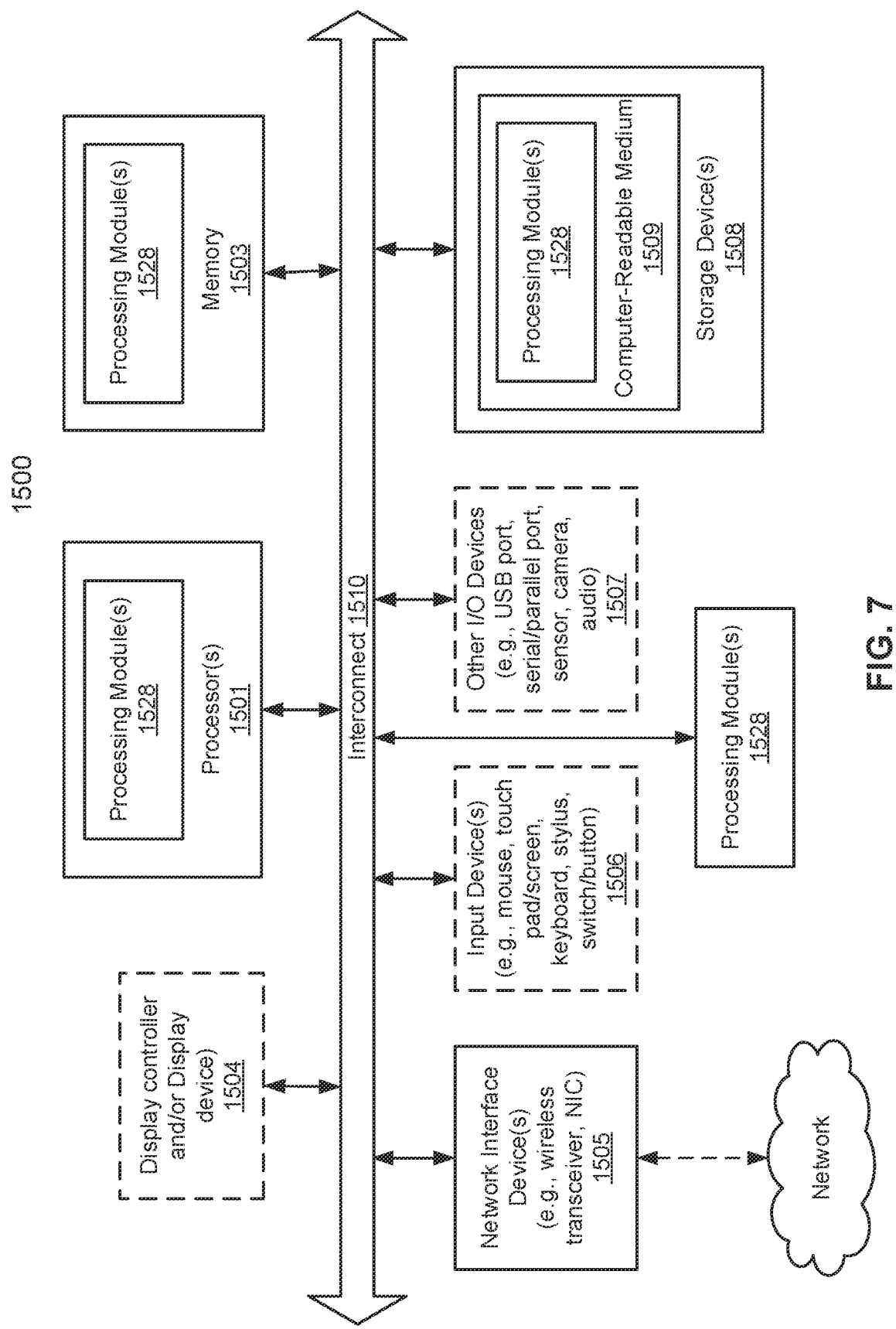
FIG. 7 shows an example data processing system, according to some embodiments.

FIG. 7 shows an example data processing system, according to some embodiments. This example data processing system, which can be described as a computing system, may be used in conjunction with one or more embodiments of the disclosure, such as for performing the methods described, and/or as a computing device as described throughout the disclosure.

For example, system 1500 may represent any of data processing systems on which a management service, a container, or services can reside, that can perform any of the processes or methods described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein.

Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS)transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of the data manager, host, cloud provider, etc., such as, for example, backup application 302. Processing modules 1528 may also reside, completely or at least partially, within memory 1503 and/or within processor 1501 during execution thereof by system 1500, memory 1503, and processor 1501, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method, performed by a management service running on a computing device, comprising:
    receiving a metadata that declares runtime dependencies for each of one or more services, wherein each runtime dependency is another one of the one or more services and wherein the metadata includes a deployment queue that indicates a runtime dependency graph of the one or more services;
    selecting, based on the metadata, a first of the one or more services that does not have runtime dependencies or the runtime dependencies are operational;
    starting the first of the one or more services to deploy the one or more services, including popping the first of the one or more services off of the deployment queue to indicate the starting of the first of the one or more services;
    querying the first of the one or more services to determine if the first of the one or more services is operational;
    in response to the first of the one or more services not being operational, waiting for the first of the one or more services to become operational; and
    in response to the first of the one or more services being operational, adding to the deployment queue, those of the one or more services that depend on the first of the one or more services, and selecting and starting a second of the one or more services to deploy the one or more second services including popping the second of the one or more services off of the deployment queue in accordance with the runtime dependency graph to indicate the starting of the second of the one or more services.

2. The method of claim 1, wherein the second of the one or more services is selected such that it does not have any runtime dependencies or those runtime dependencies are operational.

3. The method of claim 2, wherein determining that the first service is operational includes receiving a response from the first service that it is operational.

4. The method of claim 1, wherein the metadata includes a data structure that represents a runtime dependency graph of the one or more services.

5. The method of claim 4, wherein the data structure stores, for each of the one or more services, a service identifier as a key, and the runtime dependencies of the respective one or more services as a set of values.

6. The method of claim 1, comprising selecting and starting each of the one or more services until all of the one or more services are operational, the one or more services being selected in a topological ordering.

7. The method of claim 1, wherein the one or more services are one or more microservices that run in a containerized environment.

8. A non-transitory computer-readable medium storing instructions which, when executed by one or more processors of a networked computing device, cause the computing device to perform operations comprising:
   receiving a metadata that declares runtime dependencies for each of one or more services, wherein each runtime dependency is another one of the one or more services and wherein the metadata includes a deployment queue that indicates a runtime dependency graph of the one or more services;
   selecting, based on the metadata, a first of the one or more services that does not have runtime dependencies or the runtime dependencies are operational;
   starting the first of the one or more services to deploy the one or more services, including popping the first of the one or more services off of the deployment queue to indicate the starting of the first of the one or more services;
   querying the first of the one or more services to determine if the first of the one or more services is operational;
   in response to the first of the one or more services not being operational, waiting for the first of the one or more services to become operational; and
   in response to the first of the one or more services being operational, adding to the deployment queue, those of the one or more services that depend on the first of the one or more services, and selecting and starting a second of the one or more services to deploy the one or more second services including popping the second of the one or more services off of the deployment queue in accordance with the runtime dependency graph to indicate the starting of the second of the one or more services.

9. The non-transitory computer-readable medium of claim 8, wherein the second of the one or more services is selected such that it does not have any runtime dependencies or those runtime dependencies are operational.

10. The non-transitory computer-readable medium of claim 9, wherein determining that the first service is operational includes receiving a response from the first service that it is operational.

11. The non-transitory computer-readable medium of claim 8, wherein the metadata includes a data structure that represents a runtime dependency graph of the one or more services.

12. The non-transitory computer-readable medium of claim 11, wherein the data structure stores, for each of the one or more services, a service identifier as a key, and the runtime dependencies of the respective one or more services as a set of values.

13. The non-transitory computer-readable medium of claim 8, comprising selecting and starting each of the one or more services until all of the one or more services are operational, the one or more services being selected in a topological ordering.

14. The non-transitory computer-readable medium of claim 8, wherein the one or more services are one or more microservices that run in a containerized environment.

15. A data processing system, comprising:
   computer-readable memory; and
   a processor that executes instructions stored on the computer-readable memory, causing the data processing system to perform operations including:
   receiving a metadata that declares runtime dependencies for each of one or more services, wherein each runtime dependency is another one of the one or more services and wherein the metadata includes a deployment queue that indicates a runtime dependency graph of the one or more services;
   selecting, based on the metadata, a first of the one or more services that does not have runtime dependencies or the runtime dependencies are operational;
   starting the first of the one or more services to deploy the first of the one or more services, including popping the first of the one or more services off of the deployment queue to indicate the starting of the first of the one or more services;
   querying the first of the one or more services to determine if the first of the one or more services are operational;
   in response to the first of the one or more services not being operational, waiting for the first of the one or more services to become operational; and
   in response to the first of the one or more services being operational, adding to the deployment queue, those of the one or more services that depend on the first of the one or more services, and selecting and starting a second of the one or more services to deploy the one or more second services including popping the second of the one or more services off of the deployment queue in accordance with the runtime dependency graph to indicate the starting of the second of the one or more services.

16. The data processing system of claim 15, wherein the second of the one or more services is selected such that it does not have any runtime dependencies or those runtime dependencies are operational.

17. The data processing system of claim 16, wherein determining that the first service is operational includes receiving a response from the first service that it is operational.

18. The data processing system of claim 15, wherein the metadata includes a data structure that represents a runtime dependency graph of the one or more services.

19. The data processing system of claim 18, wherein the data structure stores, for each of the one or more services, a service identifier as a key, and the runtime dependencies of the respective one or more services as a set of values.

20. The data processing system of claim 15, wherein the one or more services are one or more microservices that run in a containerized environment.

* * * * *